(12) United States Patent
Drescher et al.

(10) Patent No.: US 9,960,528 B2
(45) Date of Patent: May 1, 2018

(54) ELECTRIC DEVICE

(71) Applicant: Kostal Kontakt Systeme GmbH, Luedenscheid (DE)

(72) Inventors: Thomas Drescher, Hueckeswagen (DE); Jiri Keclik, Dobris (CZ); Petr Spunar, Nizbor (CZ); Teodor Knobloch, Pribram (CZ)

(73) Assignee: Kostal Kontakt Systeme GmbH, Luedenscheid (DE)

( * ) Notice: Subject to any disclaimer, the term of this patent is extended or adjusted under 35 U.S.C. 154(b) by 0 days. days.

(21) Appl. No.: 15/420,492

(22) Filed: Jan. 31, 2017

(65) Prior Publication Data

US 2017/0141512 A1 May 18, 2017

Related U.S. Application Data

(63) Continuation of application No. PCT/EP2015/068905, filed on Aug. 18, 2015.

(30) Foreign Application Priority Data

Aug. 20, 2014 (DE) .......................... 10 2014 012 335

(51) Int. Cl.
   *H01R 13/58* (2006.01)
   *H02G 3/06* (2006.01)
   *H01R 13/53* (2006.01)

(52) U.S. Cl.
   CPC ......... *H01R 13/5816* (2013.01); *H01R 13/53* (2013.01); *H02G 3/0625* (2013.01)

(58) Field of Classification Search
   CPC .. H01R 9/0524; H01R 2103/00; H01R 24/38; H01R 13/622; H01R 9/0521;
   (Continued)

(56) References Cited

U.S. PATENT DOCUMENTS 3,846,738 A * 11/1974 Nepovim ................. H01R 9/05
   439/584
4,963,104 A * 10/1990 Dickie ................. H01R 9/0524
   439/460

(Continued)

FOREIGN PATENT DOCUMENTS

DE           4011024 C1    8/1991
DE      102010007093 A1    8/2011
(Continued)

OTHER PUBLICATIONS

European Patent Office, International Search Report for the corresponding International Application No. PCT/EP2015/068905 dated Oct. 27, 2015.

(Continued)

*Primary Examiner* — Truc Nguyen
(74) *Attorney, Agent, or Firm* — Brooks Kushman P.C.

(57) ABSTRACT

An electrical device includes a housing, a retaining cap, and a sleeve. The housing has a cable port through which a cable is led into the housing. The retaining cap has a passage opening through which the cable is led through the retaining cap. The sleeve has a fixing section resting against a sheath of the cable and an annular face extending radially with respect to the cable. In an assembled state of the electrical device, the retaining cap is joined to the sleeve and fixes the sleeve to the cable port with the passage opening of the retaining cap engaging over the fixing section of the sleeve and an edge surface of the passage opening pressing the fixing section against the sheath of the cable. Further in the assembled state, the retaining cap and the cable port may be connected to one another by a bayonet connector.

10 Claims, 5 Drawing Sheets

(58) Field of Classification Search
CPC ...... H01R 13/6592; H01R 24/40; H01R 9/05; H01R 9/0503; H01R 9/0518; H01R 13/502; H01R 13/512; H01R 13/52; H01R 13/5205

See application file for complete search history.

(56) References Cited

U.S. PATENT DOCUMENTS

| | | | | |
|---|---|---|---|---|
| 5,586,910 | A | * | 12/1996 | Del Negro ........... H01R 9/0521 439/584 |
| 6,149,455 | A | * | 11/2000 | Levi ...................... H01R 13/59 439/321 |
| 7,938,674 | B2 | * | 5/2011 | Lindkamp .............. H01R 13/59 439/461 |
| 8,819,893 | B2 | | 9/2014 | Shishido et al. |
| 9,306,315 | B2 | * | 4/2016 | Scholten ............. H02G 15/007 |
| 9,638,871 | B2 | * | 5/2017 | Bund ..................... G02B 6/387 |
| 2006/0105628 | A1 | * | 5/2006 | Montena ............. H01R 9/0524 439/578 |
| 2010/0248516 | A1 | * | 9/2010 | Hui ....................... H01R 13/52 439/271 |
| 2011/0033157 | A1 | * | 2/2011 | Drouard ............... G02B 6/4477 385/77 |
| 2012/0034817 | A1 | | 2/2012 | Plate et al. |
| 2012/0225581 | A1 | * | 9/2012 | Amidon ............... H01R 9/0524 439/584 |
| 2012/0292098 | A1 | | 11/2012 | Kinzl et al. |
| 2014/0115822 | A1 | * | 5/2014 | Shishido ................... F16L 5/02 16/2.1 |
| 2014/0202760 | A1 | * | 7/2014 | Pelletier ............... H02G 3/0658 174/653 |

FOREIGN PATENT DOCUMENTS

| | | |
|---|---|---|
| EP | 2615894 A1 | 7/2013 |
| GB | 468917 A | 7/1937 |

OTHER PUBLICATIONS

German Patent and Trademark Office, German Search Report for the corresponding German Patent Application No. DE 10 2014 012 335.9 dated Sep. 30, 2015.

* cited by examiner

ELECTRIC DEVICE

CROSS-REFERENCE TO RELATED APPLICATIONS

This application is a continuation of International Application No. PCT/EP2015/068905, published in German, with an International filing date of Aug. 18, 2015, which claims priority to DE 10 2014 012 335.9, filed Aug. 20, 2014; the disclosures of which are hereby incorporated in their entirety by reference herein.

TECHNICAL FIELD

The present invention relates to an electrical device including a housing having a cable port through which a cable is led into the interior of the housing, a retaining cap having a passage opening through which the cable is led, and a sleeve having a fixing section resting against the sheath of the cable and an annular face extending radially with respect to the cable in which the retaining cap fixes the sleeve to the cable port in an assembled state of the electrical device.

BACKGROUND

Electrical devices not having a built-in power supply generally have at least one electrical connecting line. An electrical connecting line of an electrical device may be either connected to the housing of the device via an electrical plug-in connection or led via a housing opening into the interior of the device, where internal device components are contacted. In the latter case, the cable is to be fastened to the housing so that the electrical connecting line is not damaged by small tensile forces acting on the cable. The means and arrangements used for this purpose are generally referred to as strain relief devices. The terms "electrical device" and "electric device" are to be understood herein broadly. In particular, these terms encompass connection sockets and plug-in connectors.

The functional principle of strain relief for a connecting line is based on fixing the connecting line in a clamping manner. The connecting line may be fixed in a clamping manner by joining together housing parts or by tightening a screw connection to the housing. In many cases, the housing of an electrical device is made up of two joinable housing parts. The housing parts join together and clamp the connecting line between them at a location provided for this purpose. However, this type of strain relief does not function as well when rigid connecting cables having relatively large cross sections are to be fastened to a housing. In particular, when multiple cables are to be attached to a housing, it is advantageous to provide fastening means particularly suited for this purpose.

DE 10 2010 007 093 A1 (corresponds to U.S. Publication No. 2012/0292098) describes an electrical device having a cable feedthrough through a housing wall. A connection socket for a photovoltaic system has two cable ports integrally formed on its housing. A relatively rigid, shielded high-voltage cable is led into the interior of the housing through a cable port. The cable is fastened by crimping a sleeve on the outer sheathing of the cable. An annular face on the sleeve is placed against the end face of the cable port. The sleeve is fastened by a union nut screw-able onto the cable port.

Establishing this type of cable fastening involves a relatively high level of assembly effort. This is firstly due to the crimping operation that must be carried out and secondly due to the comparatively large time expenditure for establishing the screw connection. Therefore, such a design has only limited suitability for electrical devices which are manufactured in large amounts and to which multiple cables are to be fastened.

SUMMARY

An object is an electrical device for which one or more cables may be fixed to respective cable ports of the electrical device in a particularly simple, rapid, reliable, and cost-effective manner.

In carrying out at least one of the above and/or other objects, an electrical device is provided. The electrical device includes a housing, a retaining cap, and a sleeve. The housing has a cable port through which a cable is led into the housing. The retaining cap has a passage opening through which the cable is led through the retaining cap. The sleeve has a fixing section resting against a sheath of the cable and an annular face extending radially with respect to the cable. In an assembled state of the electrical device, the retaining cap is joined to the sleeve and fixes the sleeve to the cable port with the passage opening of the retaining cap engaging over the fixing section of the sleeve and an edge surface of the passage opening pressing the fixing section against the sheath of the cable thereby fastening the cable to the cable port.

The electrical device may further include a bayonet connector. In the assembled state, the retaining cap and the cable port are connected to one another by the bayonet connector.

The edge surface of the passage opening of the retaining cap may have a conical shape.

The edge surface of the passage opening of the retaining cap and the fixing section of the sleeve may be configured to not be oriented in parallel to one another upon the retaining cap being fixed to the sleeve. The edge surface may have a conical shape for the edge surface and the fixing section to be configured to not be oriented in parallel to one another upon the retaining cap being fixed to the sleeve.

The fixing section of the sleeve may include a ring-shaped arrangement of lamellae oriented approximately perpendicular with respect to the annular face of the sleeve. The lamellae may include integrally molded gradations and indentations which form a claw-like structure. The lamellae rest extend into the passage opening of the retaining cap and lie against the sheath of the cable in an axial orientation with respect to the cable with the claw-like structure of the lamellae pressing into the sheath of the cable when the edge surface of the passage opening presses the fixing section against the sheath of the cable.

The retaining cap may further include a collar having two recesses which allow the retaining cap to be rotated onto the cable port.

The housing may further include a second cable port and a connecting section. The cable ports are connected to one another via the connecting section.

The annular face of the sleeve may include an upper annular part and a lower annular part. The upper annular part has a larger diameter than the lower annular part. The lower annular part inserts into the cable port and the upper annular part rests against an outer end face of the cable port when the sleeve is fixed to the cable port.

The electrical device may further include a clamp including two identical clamping bodies that are joined together.

The clamping bodies of the clamp are positioned around the cable and pressed together for the clamp to fix the cable to the cable port.

An embodiment provides an electric device including a housing having a molded-on cable port (cable inlet stub, cable inlet connection) through which a cable is guided into the interior of the housing, a retaining cap (retaining flap) including a passage opening (through opening) through which the cable is guided, and a sleeve including a fixing section (fastening segment) lying against the sheath of the cable and an annular face (annular surface) extending radially to the cable. In an assembled state of the electric device, the retaining cap fastens the sleeve to the cable port with the passage opening of (in) the retaining cap extending over the fixing section of the sleeve and an edge surface of the passage opening pressing the fixing segment against the sheath of the cable. Further in the assembled state, the retaining cap and the cable port may be connected to each other by a bayonet connection.

In embodiments of the electrical device, in an assembled state of the electrical device the passage opening in the retaining cap engages over the fixing section of the sleeve, an edge surface of the passage opening presses the fixing section against the sheath of the cable, and a bayonet connector connects the retaining cap and the cable port to one another. The bayonet connection of the bayonet connector allows the retaining cap and the cable port to be quickly connected compared to the relatively time-consuming procedure of screwing the retaining cap onto a cable port.

The engagement of the passage opening over the fixing section of the sleeve fixes the sleeve to the retaining cap and presses the fixing section against the cable sheathing. Strain relief and fastening of the cable to the housing with protection from vibrations are achieved in this way.

The annular face of the sleeve centers the cable within the cable port. In an embodiment, the diameter of the annular face corresponds exactly to the internal diameter of the cable port.

In embodiments, the dimensions of the diameter of the sleeve in the area of the fixing section and/or the dimensions of the internal diameter of the passage opening of the retaining cap in the axial direction of the cable port or the cable vary. The dimensions of the diameter of the sleeve in the area of the fixing section of the sleeve may vary in such a manner for the fixing section to have a conical shape. The dimensions of the internal diameter of the passage opening of the retaining cap may vary in such a manner for the passage opening to have a conical shape. The fixing section and/or the passage opening having a conical shape results in a particularly high pressing force of the fixing section on the cable when the retaining cap and the sleeve are joined together.

An additional clamp connectable to the cable may be provided to increase the strain relief. The clamp may be situated inside the cable port in a force-fit or form-fit manner.

The design of the electrical device in accordance with embodiments allows one or more cables, which may be relatively rigid and/or have a relatively large cross-section, to be quickly fastened to a housing with little effort, with strain relief and protection from vibrations.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1, 2, 3, and 4 illustrate respective assembly phases of an electrical device in accordance with an exemplary embodiment. The electrical device forms by way of example a plug-in connector part for high-voltage electrical connections. However, an electrical device having such a design may be provided for some other function. The electrical device in particular may contain various electrical and/or electronic components.

The electrical device includes a housing 1. Housing 1 has a cable port 2 through which a cable 3 is guided into the interior of the housing. For instance, housing 1 is illustrated to have three adjacently situated integrally molded cable ports 2. Cables (i.e., connecting lines) may be led through respective cable ports into the interior of the housing. In FIGS. 1, 2, 3, and 4, a cable 3 which has been led into housing 1 but not yet completely mounted on housing 1 is discernible on one of cable ports 2. To achieve reliable functioning of the electrical device, cable 3 should be fastened to cable port 2 so as to protect cable 3 from vibrations and the action of tensile forces.

The electrical device further includes a retaining cap 4 and a sleeve 6. Retaining cap 4 and sleeve 6 are used for the purpose of fastening cable 3 to cable port 2 so as to protect cable 3 from vibrations and the action of tensile forces to achieve reliable functioning of the electrical device.

Figure 5:
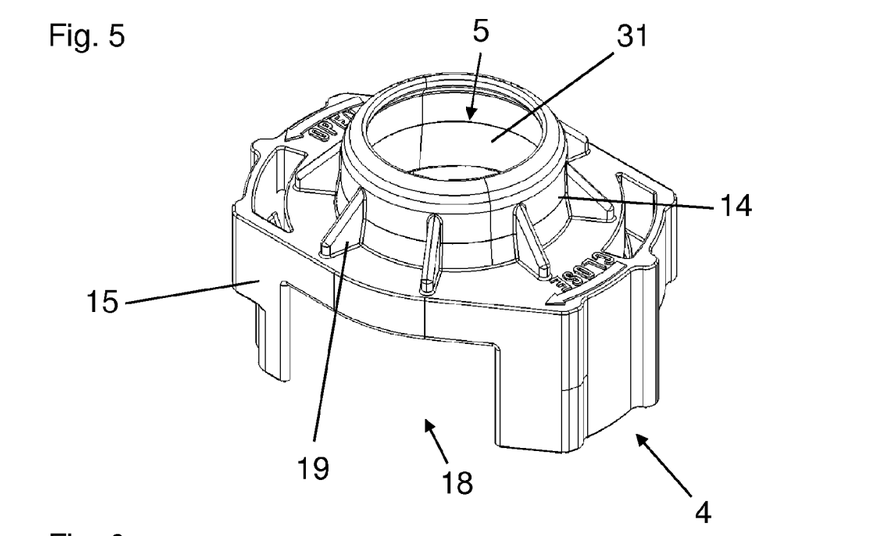
FIG. 5 illustrates the retaining cap as an individual part.
Figure 6:
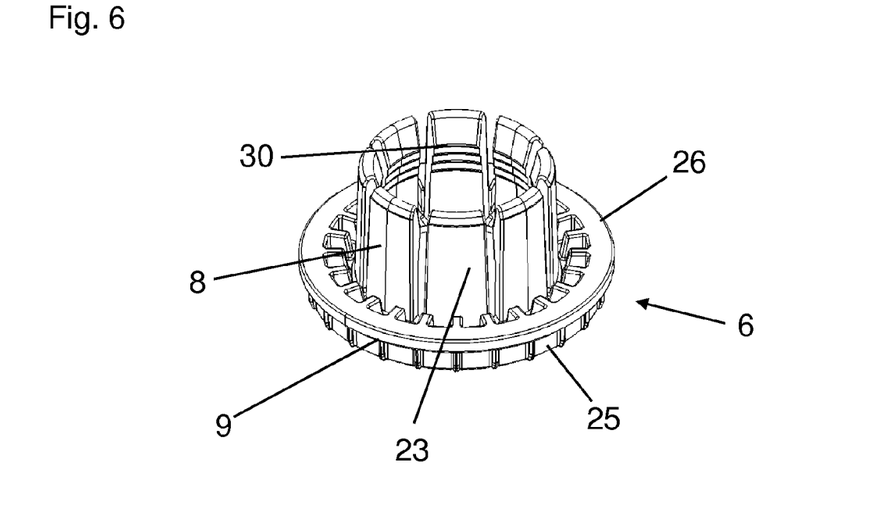
FIG. 6 illustrates the sleeve as an individual part.

FIGS. 5 and 6 illustrate retaining cap 4 and sleeve 6 as individual parts, respectively. As shown in FIG. 5, retaining cap 4 has on its top side a short tubular portion 14. Tubular portion 14 includes a passage opening 5. The inner surface of tubular portion 14 forms an edge surface 31 of passage opening 5. Retaining cap 4 includes a collar 15 having recesses 18 at two locations. One of the recesses 18 is visible in FIG. 5. Recesses 18 allow retaining cap 4 to be rotated on cable port 2.

Figure 1:
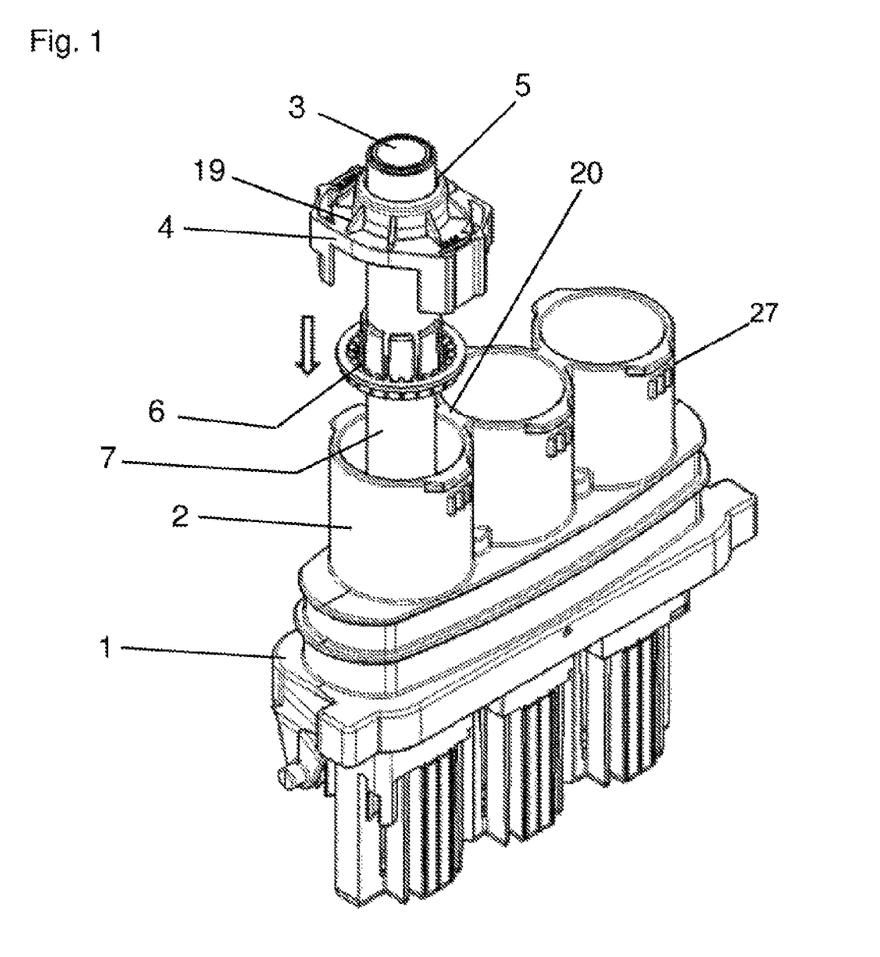
FIGS. 1, 2, 3, and 4 illustrate an electrical device in respective assembly phases, the electrical device having a housing, a retaining cap, and a sleeve.

As best shown in FIG. 1, cable port 2 is not situated in a free-standing manner, but is instead connected in one piece to an adjacent cable port via a connecting section 20. The one-piece connection of cable ports 2 via connecting sections 20 allows a design of housing 1 which is substantially more solid and thus more stable, with the installation size otherwise unchanged.

Ribs 19 are molded onto the sides of retaining cap 4 on tubular portion 14 and make retaining cap 4 more stable. At the same time, ribs 19 are used as a handling aid during fastening of retaining cap 4 to cable port 2.

As shown in FIG. 6, sleeve 6 includes a fixing section 8 and an annular face 9. Fixing section 8 is formed from vertical lamellae (fins, slats, etc.) 23. Lamellae 23 are adjacently situated in a ring and oriented approximately perpendicularly with respect to annular face 9. Lamellae 23 include a claw-like structure 30 on the upper inner side of fixing section 8. Claw-like structure 30 is formed on lamellae 23 via integrally molded gradations and indentations. After lamellae 23 are pushed onto cable 3, lamellae 23 rest against cable sheath 7 in an axial orientation with respect to cable 3 (FIGS. 1 and 9) while the annular face 9 protrudes radially from cable 3.

Figures 2, 3, 4:
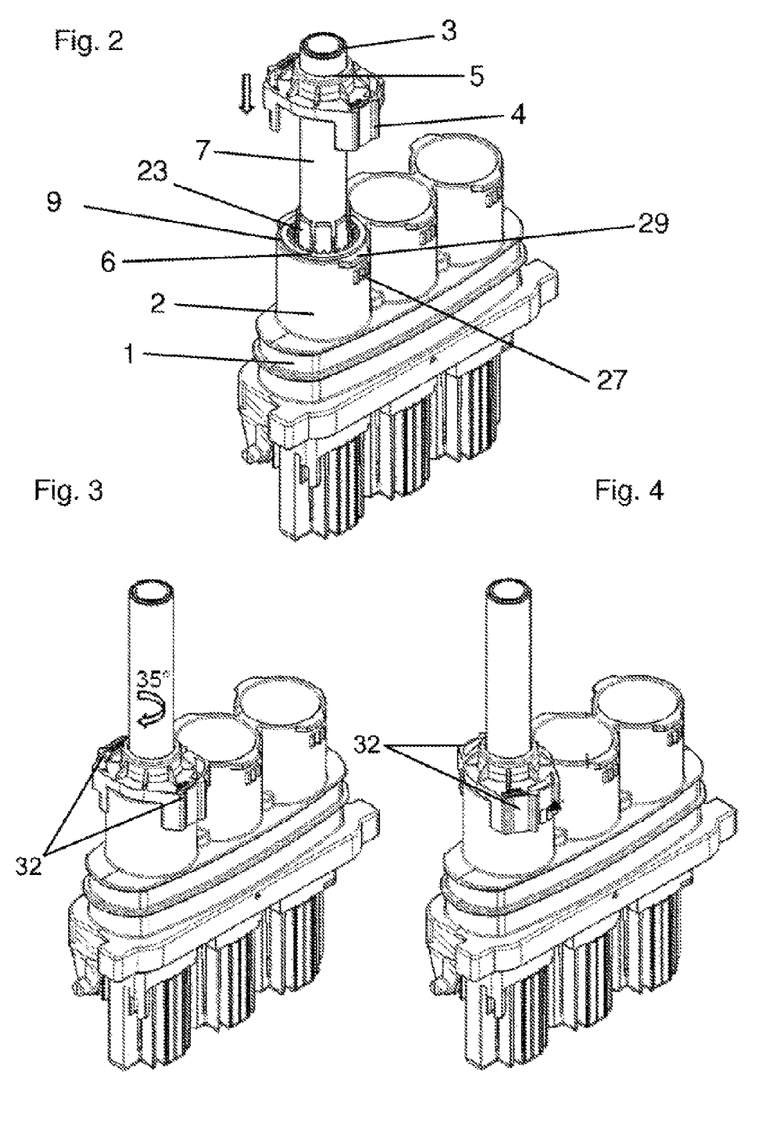

Annular face 9 is made up of two mutually parallel annular parts 25, 26. Annular parts 25, 26 are formed as one piece and have different external diameters. The dimension of the external diameter of lower annular part 25 of annular face 9 corresponds to the dimension of the internal diameter of an associated cable port 2. As such, lower annular part 25 may be inserted with an exact fit into cable port 2. In contrast, the external diameter of upper annular part 26 of annular face 9 is slightly larger. As such, a step is formed between lower and upper annular parts 25, 26. When sleeve 6 is attached to cable port 2, upper part 26 thus comes to rest against the outer end face of cable port 2. The assembly state thus achieved is illustrated in FIG. 2. It is apparent here that lamellae 23 rest against the outer side of cable sheath 7 and extend away from housing 1 in the direction of retaining cap 4, which is not yet attached.

When retaining cap 4 is attached to cable port 2, lamellae 23 of sleeve 6 extend into passage opening 5 of retaining cap 4. The internal diameter of passage opening 5 is such that lamellae 23 are pressed tightly against cable sheath 7 of cable 3. In an embodiment, the inner surface of tubular portion 14 of retaining cap 4 and the surface of lamellae 23 are not oriented in parallel to one another. For example, the inner surface of tubular portion 14 and the surface of lamellae 23 are not oriented in parallel to one another by virtue of the diameter of passage opening 5 and/or the diameter of fixing section 8 formed by lamellae 23 having a variable design in the axial direction. When retaining cap 4 and sleeve 6 are joined together, as illustrated in FIG. 3, a high pressing force on cable 3 may be achieved by such a conical shape.

After retaining cap 4 and sleeve 6 are joined together, retaining cap 4 is fixed to cable port 2 as the last connection step. This is carried out easily and quickly by rotating retaining cap 4 by approximately 35° in the clockwise direction (see FIGS. 3 and 4). This causes connecting elements of a bayonet connector 10 to engage with one another and tightly press retaining cap 4 and cable port 2 together. Since the design principle of a bayonet connector 10 is basically known, for example from bayonet lens mounts for interchangeable camera lenses, it is not illustrated in greater detail. The drawings (in particular, FIG. 9) show only contour sections 29 that are molded onto cable port 2. Contour sections 29 are slightly ascending. Contour sections 29 are, for example, inserted into recesses in a flange ring (not illustrated) molded onto the underside of retaining cap 4.

Figure 9:
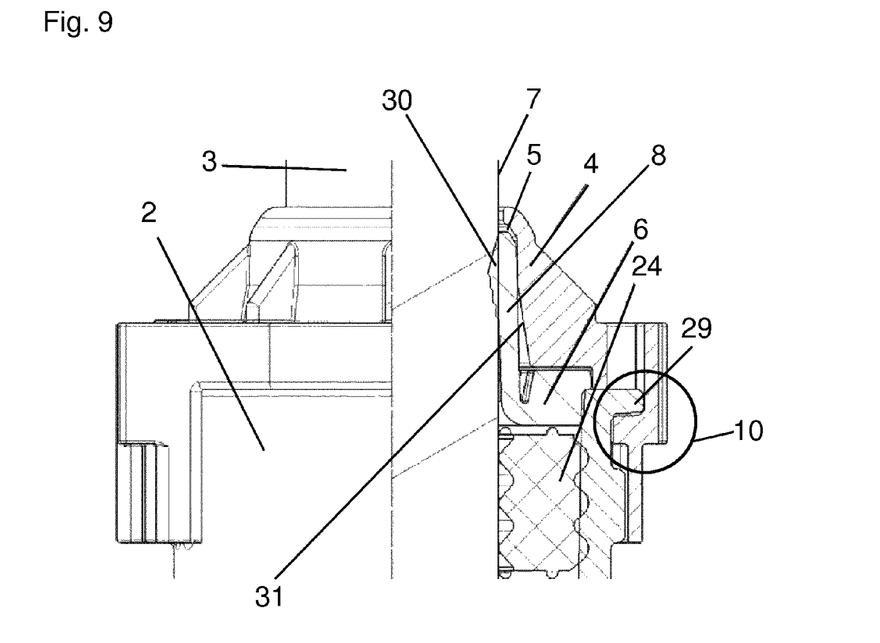
FIG. 9 illustrates a sectional view of the electrical device.

Bayonet connector 10 is partially illustrated in the sectional view in FIG. 9. It is apparent how contour section 29 of cable port 2 is enclosed by housing sections of retaining cap 4. FIG. 9 also shows how edge surface 31 of the upwardly narrowing passage opening 5 of retaining cap 4 presses lamellae 23 of sleeve 6 against cable sheath 7 of cable 3, with claw-like structure 30 of lamellae 23 pressing tightly into cable sheath 7.

Bayonet connector 10 may be supplemented in a particularly advantageous manner with a multistep detent connection. By way of example bayonet connector 10 includes three detent ribs 27 molded onto the outer side of cable port 2. Detent ribs 27 cooperate with an appropriately shaped locking tab 32 on the inner side of retaining cap 4.

This detent connection on the one hand secures bayonet connector 10. On the other hand, this detent connection is used as an assembly aid in establishing bayonet connector 10. In particular, the locking operation makes the closing of bayonet connector 10 haptically and acoustically perceivable, thus ensuring a defined end locking state (shown in FIG. 4).

Figure 7:
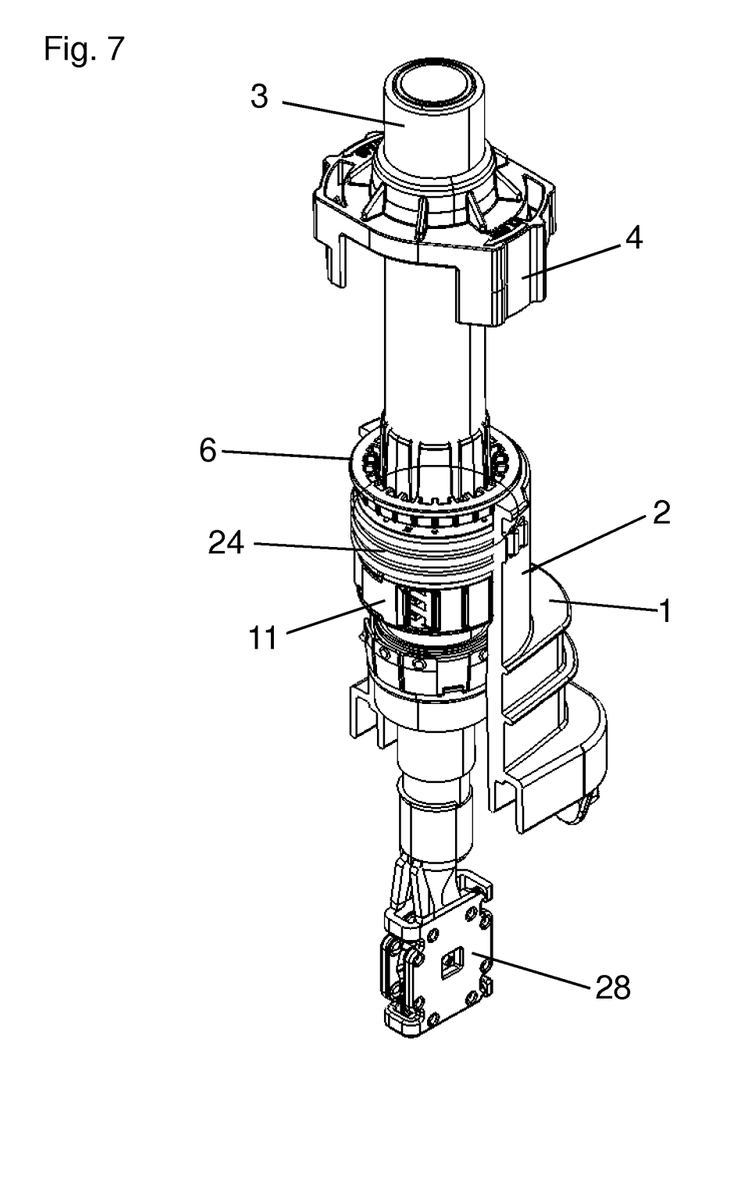
FIG. 7 illustrates a sectional view of a portion of the electrical device.

For further explanation of the cable fastener, FIG. 7 illustrates a sectional view of a portion of the electrical device which forms a high-voltage plug-in connector. Apparent is a plug socket 28 attached to a conductor of cable 3. A blade connector may be inserted into plug socket 28 from the bottom side of housing 1. Further aspects concerning the design of this type of high-voltage plug-in connector may be found in DE 10 2009 016 157 A1 (corresponding to U.S. Publication No. 2012/0034817). Accordingly, a detailed explanation may be dispensed with here.

The electrical device may further include a clamp 11. Further improvement in strain relief is achieved by clamp 11. Clamp 11 is connectable to cable 3 and establishes a force-fit or preferably form-fit connection to cable port 2.

Clamp 11 is also used as an abutment for a radial seal 24. Radial seal 24 is axially compressed by sleeve 6 during fastening to retaining cap 4 and at the same time is thus pressed tightly radially against the inner walls of cable port 2. Radial seal 24 thus prevents the penetration of moisture into housing 1 from the cable side.

Figure 8:
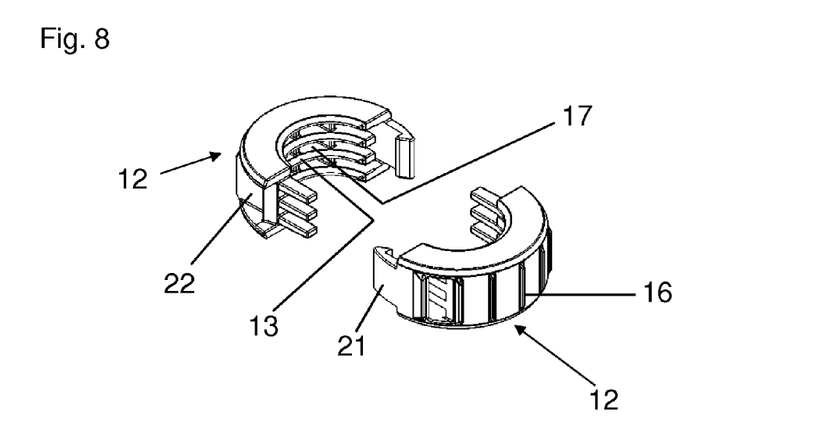
FIG. 8 illustrates the parts of a clamp of the electrical device.

Clamp 11 includes two joinable clamping bodies 12. Clamping bodies 12 are illustrated in FIG. 8 as individual parts. Each clamping body 12 forms essentially a one-piece half-ring having multiple mutually parallel contact ribs 16. Contact ribs 16 of a clamping body 12 are molded onto the outer side of the clamping body. Contact ribs 16 after assembly assist with a play-free seat of clamp 11 in cable port 2. It is particularly advantageous that the two joinable clamping bodies 12 may have an identical design. Clamping bodies 12 may thus be manufactured in large numbers as cost-effective identical parts.

Clamping bodies 12, illustrated with an identical design in FIG. 8, may be combined to form a closed ring which forms clamp 11 (discernible in FIG. 7). Multiple clamping ribs 13, situated in parallel to one another and separated by gaps 17, are situated on each of clamping bodies 12. When clamping bodies 12 are joined together, arch-shaped clamping ribs 13 of one clamping body 12 fit into gaps 17 on the respective other clamping body 12, thus forming an interlocked arrangement of clamping ribs 13.

For fastening clamp 11 to a cable 3, the two clamping bodies 12 are positioned on both sides of cable 3 and then pressed together. Detent elements 21, 22 hereby lock with one another at the outer housing parts of clamping bodies 12 and press clamping ribs 13 against cable sheath 7. Clamp 11 is fixed to cable 3 in this way.

LIST OF REFERENCE NUMERALS

1 Housing
2 Cable port (cable inlet connection, cable inlet stub)
3 Cable
4 Retaining cap
5 Passage opening (through opening)
6 Sleeve
7 Cable sheath 8 Fixing section (fastening segment)
9 Annular face (annular surface)
10 Bayonet connector (bayonet connection)
11 Clamp
12 Clamping body
13 Clamping ribs
14 Tubular portion
15 Collar
16 Contact ribs
17 Gaps
18 Recesses
19 Ribs
20 Connecting section
21, 22 Detent elements
23 Lamellae (flats, slats)
24 Radial seal
25 (Lower) annular part
26 (Upper) annular part
27 Detent ribs
28 Plug socket
29 Contour section
30 Claw-like structure
31 Edge surface
32 Locking tab of the retaining cap While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electrical device comprising:
a housing having a cable port through which a cable is led into the housing; a retaining cap having a passage opening through which the cable is led through the retaining cap;
a sleeve having a fixing section and an annular face extending radially with respect to the cable; and
wherein an edge surface of the passage opening of the retaining cap has a conical shape and the ring-shaped arrangement of lamellae of the fixing section of the sleeve is oriented approximately perpendicular with respect to the annular face of the sleeve so that the edge surface of the passage opening and the fixing section of the sleeve are configured to not be oriented in parallel to one another upon the retaining cap being joined to the sleeve: and
wherein in an assembled state the retaining cap is joined to the sleeve and fixes the sleeve to the cable port with the passage opening of the retaining cap engaging over the fixing section of the sleeve and the edge surface of the passage opening pressing the lamellae directly against the sheath of the cable thereby fastening the cable to the cable port.

2. The electrical device of claim 1 further comprising:
a bayonet connector; and
wherein in the assembled state the retaining cap and the cable port are connected to one another by the bayonet connector.

3. The electrical device of claim 1 wherein:
the lamellae include integrally molded gradations and indentations which form a claw-like structure.

4. The electrical device of claim 3 wherein:
the lamellae of the fixing section extend into the passage opening of the retaining cap and lie directly against the sheath of the cable in an axial orientation with respect to the cable with the claw-like structure of the lamellae pressing into the sheath of the cable when the edge surface of the passage opening presses the lamellae directly against the sheath of the cable.

5. The electrical device of claim 1 wherein:
the retaining cap further includes a collar having two recesses which allow the retaining cap to be rotated onto the cable port.

6. The electrical device of claim 1 wherein:
the housing further includes a second cable port and a connecting section, wherein the cable ports are connected to one another via the connecting section.

7. The electrical device of claim 1 wherein:
the annular face of the sleeve includes an upper annular part and a lower annular part, wherein the upper annular part has a larger diameter than the lower annular part; and
the lower annular part inserts into the cable port and the upper annular part rests against an outer end face of the cable port when the sleeve is fixed to the cable port.

8. The electrical device of claim 1 further comprising:
a clamp including two identical clamping bodies that are joined together, wherein the clamping bodies of the clamp are positioned around the cable and pressed together for the clamp to fix the cable to the cable port.

9. The electrical device of claim 1 wherein:
the cable is an electrical high-voltage cable.

10. The electrical device of claim 1 wherein:
the electrical device is an electrical plug-in connector.

* * * * *

UNITED STATES PATENT AND TRADEMARK OFFICE
CERTIFICATE OF CORRECTION

PATENT NO. : 9,960,528 B2  
APPLICATION NO. : 15/420492  
DATED : May 1, 2018  
INVENTOR(S) : Thomas Drescher et al.

Page 1 of 1

It is certified that error appears in the above-identified patent and that said Letters Patent is hereby corrected as shown below:

In the Claims

Column 7, Line 41, Claim 1:
Delete "the cable; and" and insert --the cable, wherein the annular face having an inner peripheral surface and an outer peripheral surface and the fixing section including a ring-shaped arrangement of lamellae extending from the inner peripheral surface and resting directly against a sheath of the cable;--

Signed and Sealed this
Fourteenth Day of August, 2018

Andrei Iancu
*Director of the United States Patent and Trademark Office*